United States Patent
Keefe et al.

(10) Patent No.: US 7,594,359 B2
(45) Date of Patent: Sep. 29, 2009

(54) ACTIVE SEAL ASSEMBLIES FOR SOUND ISOLATION

(75) Inventors: Andrew C. Keefe, Santa Monica, CA (US); William Barvosa-Carter, Ventura, CA (US); Christopher P. Henry, Newbury Park, CA (US); Guillermo A. Herrera, Winnetka, CA (US); Geoffrey P. Mc Knight, Los Angeles, CA (US); Nancy L. Johnson, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 768 days.

(21) Appl. No.: 11/074,584

(22) Filed: Mar. 8, 2005

(65) Prior Publication Data

US 2005/0199440 A1  Sep. 15, 2005

Related U.S. Application Data

(60) Provisional application No. 60/552,781, filed on Mar. 12, 2004.

(51) Int. Cl.
*E06B 7/22* (2006.01)
(52) U.S. Cl. .................................. 49/498.1; 49/475.1
(58) Field of Classification Search ............... 49/475.1, 49/477.1, 478.1, 498.1
See application file for complete search history.

(56) References Cited

U.S. PATENT DOCUMENTS

| | | | |
|---|---|---|---|
| 4,761,917 A | 8/1988 | Knecht et al. | |
| 4,805,347 A | 2/1989 | Smith | |
| 4,956,625 A | 9/1990 | Cardone et al. | |
| 5,046,285 A | 9/1991 | Fratini, Jr. et al. | |
| 5,181,341 A * | 1/1993 | Keys et al. | 49/477.1 |
| 5,390,974 A * | 2/1995 | Theodorakakos | 296/146.9 |
| 5,489,104 A * | 2/1996 | Wolff | 277/646 |
| 5,668,744 A | 9/1997 | Varadan et al. | |
| 5,940,788 A * | 8/1999 | Morman et al. | 702/138 |
| 6,009,699 A | 1/2000 | Delvael | |
| 6,176,934 B1 | 1/2001 | Nelson | |
| 6,393,765 B1 | 5/2002 | Goldstein et al. | |
| 6,394,655 B1 * | 5/2002 | Schnur et al. | 384/247 |
| 6,485,029 B1 | 11/2002 | Moody et al. | |
| 6,489,871 B1 | 12/2002 | Barton | |
| 6,615,545 B2 | 9/2003 | Rogers, Jr. et al. | |
| 6,683,965 B1 * | 1/2004 | Sapiejewski | 381/380 |
| 6,702,301 B1 | 3/2004 | Davies et al. | |
| 2002/0113380 A1 | 8/2002 | Clark | |
| 2002/0152688 A1 | 10/2002 | Dron | |
| 2003/0019160 A1 * | 1/2003 | Oda et al. | 49/498.1 |
| 2004/0008853 A1 | 1/2004 | Pelrine et al. | |
| 2004/0253566 A1 | 12/2004 | Quinn et al. | |
| 2006/0125188 A1 * | 6/2006 | Verbrugge et al. | 277/319 |

OTHER PUBLICATIONS

"Silicone-Rubber Microvalves Actuated by Paraffin" NASA Tech Briefs NASA Tech Briefs Online by Category, Mechanics, http://www.nastech.com/Briefs/Sept04/NPO30519.html.

(Continued)

*Primary Examiner*—Gregory J. Strimbu

(57) ABSTRACT

Active seal assemblies employing active materials that can be controlled and remotely changed to alter the seal effectiveness, wherein the active seal assemblies actively change modulus properties such as stiffness, shape orientation, and the like. The active seal assemblies are generally configured to reduce the noise (sound waves) that is transmitted through the seal by measuring and actively canceling and/or absorbing the noise.

9 Claims, 2 Drawing Sheets

OTHER PUBLICATIONS

"Dielectric Elastomer Actuators in the Development of a 'Mechatronic Muscle'", Ailish O'Halloran et al., Department of Electronic Engineering, NUI, Galway Faculty of Engineering Research Day 2004 (3 pgs).

* cited by examiner

ACTIVE SEAL ASSEMBLIES FOR SOUND ISOLATION

CROSS REFERENCE TO RELATED APPLICATIONS

The present application relates to and claims priority to U.S. Provisional Application No. 60/552,781 entitled "Active Seal Assemblies" and filed on Mar. 12, 2004, the disclosure of which is incorporated by reference herein in their entirety.

BACKGROUND

This disclosure relates to seals, and more particularly, to active seal assemblies for sound isolation.

Current methods and assemblies for sealing opposing surfaces such as doors and trunk lids, for example, include the use of flexible elastic membranes and structures that sealingly compress upon pressing contact of the opposing surfaces. Typical materials include various forms of elastomers, e.g., foams and solids, that are formed into structures having solid and/or hollow cross sectional structures. The geometries of the cross sections are varied and may range from circular forms to irregular forms having multiple slots and extending vanes.

Sealing assemblies are typically utilized for sound and/or fluid management. The seals generally are exposed to a variety of conditions. For example, for vehicle applications, door seals generally are exposed to a wide range of temperatures as well as environmental conditions such as rain, snow, sun humidity conditions, and the like. Current materials utilized for automotive seals are passive. That is, other than innate changes in modulus of the seal material due to environmental stimuli, the stiffness and cross sectional geometries of the seal assemblies cannot be remotely changed or controlled.

Accordingly, it is desirable to have active seal assemblies that can be controlled and remotely changed to provide sound isolation.

BRIEF SUMMARY

Disclosed herein are active seal assemblies for sound isolation and methods of use. In one embodiment, the active seal assembly comprises a flexible hollow body comprising an interior wall defining a first chamber and a second chamber; a sensor disposed in an exterior wall of the body and in operative communication with a controller, wherein the sensor is adapted to detect an amplitude and a phase of a noise vibration and forward a signal corresponding to the amplitude and the phase to the controller; and an active material disposed within the interior wall and in operative communication with the controller, wherein the active material is adapted to cancel the signal corresponding to the amplitude and the phase in response to an activation signal from the controller.

In another embodiment, the active seal assembly comprises a flexible hollow body comprising an interior wall defining a first chamber and a second chamber; a normal force sensor disposed in an exterior wall of the body and in operative communication with a controller, wherein the normal force sensor is adapted to detect planar waves and forward a signal to the controller, wherein the controller is adapted to average the amplitudes and frequencies associated with planar waves; and an active material disposed within the interior wall and in operative communication with the controller, wherein the active material is adapted to absorb the planar waves in response to an activation signal from the controller.

In yet another embodiment, the active seal assembly comprises a flexible hollow body defining an interior wall region; a shear force sensor disposed in an exterior wall of the body and in operative communication with a controller, wherein the shear force sensor is adapted to detect a noise vibration and forward a signal to the controller; and a plurality of planar membranes comprising an active material in operative communication with the controller, wherein the plurality of planar membranes are disposed in the interior wall region and are generally parallel to a base portion of the flexible hollow body, wherein the active material is adapted to cancel the signal in response to an activation signal from the controller.

In yet still another embodiment, the active seal assembly comprises a flexible hollow body defining an interior wall region; a shear force sensor disposed in an exterior wall of the body and in operative communication with a controller, wherein the shear force sensor is adapted to detect a noise vibration and forward a signal to the controller; and a plurality of planar membranes disposed in the interior wall region and are generally parallel to a base portion of the flexible hollow body; and an active material fluid intermediate each one of the plurality of planar membranes in operative communication with the controller, wherein the active material is adapted to cancel the signal in response to an activation signal from the controller.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Disclosed herein are active sealing assemblies and methods of use, wherein the shape and/or modulus properties of the active seals employed in the active sealing assemblies can be remotely activated and/or controlled to selectively provide sound isolation and/or noise cancellation. Although reference will be made herein to automotive applications, it is contemplated that the active seals for sound isolation can be employed for various interfaces between opposing surfaces such as refrigerator doors, windows, and the like so as to mitigate and/or cancel unwanted noise. For automotive applications, the active sealing assemblies are preferably utilized between an opening in a vehicle and a surface in sliding or sealing engagement with the opening such as a vehicle door, a side passenger sliding door, window, sunroof, hatch, tailgate, and the like.

For noise control, such as controlling those unwanted noises that may occur as a result of vehicle motion, road noise, vehicle function, aging, and the like as well as external sources from intruding into an interior of a vehicle, the active seal assembly is configured to actively reduce the unwanted noise (sound waves) that is transmitted through the seal by measuring and actively canceling the noise. The active seal assemblies disclosed herein can generally be configured as a responsive sound cancellation seal assembly or a dissipative sound cancellation seal assembly.

Responsive sound cancellation seal assemblies cancel the unwanted noise by directly sensing the amplitude and phase of the noise vibrations and feeding this information to a controller, which then sends an activation signal to an active material within or in close proximity to the seal structure. The active material responds with an equal and opposite motion (i.e., anti-noise). The sensor may be surface mounted onto the seal or otherwise disposed in operative communication with the vibrations occurring in and about the seal area.

In these applications, the active material is selected to be locally responsive to changes in force and/or displacement. Suitable active materials include electroactive polymers, e.g., dielectric elastomers, ionic polymer metal composites, piezoelectric polymers and ceramics, magnetostrictive materials, thin film shape memory alloys, and other like active materials. As such, communication and processing can be local, i.e., distributed along the length of the seal in multiple discrete positions, or centrally, i.e., communication occurs between the sensor, active material, and controller.

Figure 1:
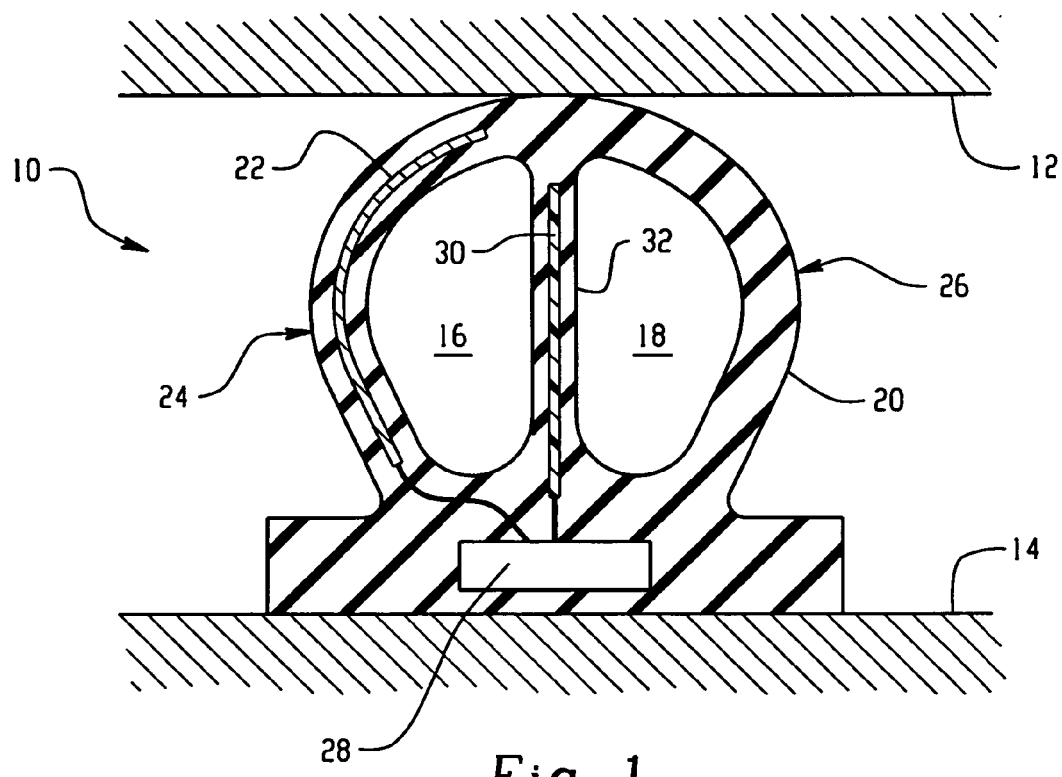
FIG. 1 is a cross sectional view of a active seal assembly adapted to provide S116, the responsive sound cancellation.

FIG. 1 illustrates an exemplary responsive sound cancellation seal assembly generally designated 10 employing an embedded active material. The seal assembly 10 is illustrated intermediate two opposing surfaces 12, 14, e.g. a door pillar and a doorframe. The seal assembly 10 includes a body 20 formed of a flexible material 20 and having a cross sectional wall structure defining two chambers 16, 18. The flexible material preferably comprises those materials already utilized for the manufacture of passive seals. For example, various rubbers, foams, elastomers, and the like can be utilized to form the body. As such, suitable seal materials include, but are not intended to be limited to, styrene butadiene rubber, polyurethanes, polyisoprene, neoprene, chlorosulfonated polystyrenes, various elastomers, and the like.

A sensor 22 is embedded within an exterior wall 24 of the body 20. The exterior wall 24 is in closer proximity to the source of unwanted noise relative to an interior wall 26. The sensor 22 is in operative communication with a controller 28, which is also in operative communication with active material 30. The active material 30 is embedded within an intermediate wall 32 that defines the two chambers 16, 18. In this embodiment, the active material 30 is preferably an embedded piezoelectric material, a magnetostrictive material, a thin film shape memory alloy, a dielectric elastomer, bimorph or membrane. The sensor 22 can comprise piezoelectric polymer or ceramic. The active seal assembly responds in the manner described above by providing a suitable activation signal to the active material in response to noise. As such, noise transmission into the interior region of the vehicle through the seal assembly can be reduced and/or eliminated.

Figure 2:
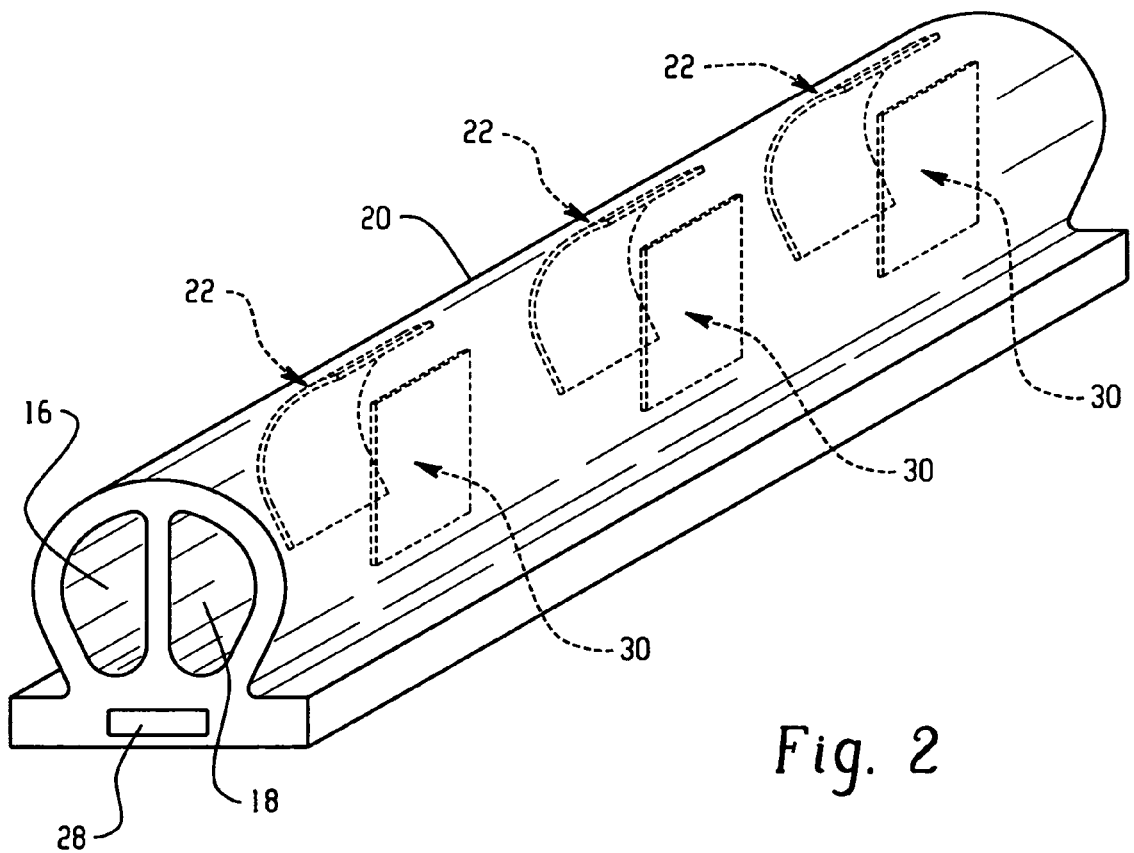
FIG. 2 is a partial perspective view the active seal assembly of FIG. 1.

FIG. 2 illustrates a partial perspective view illustrating one embodiment for distributed zones including the active seal assembly as shown in FIG. 1 along the length of the seal structure. As such, sensing and actuation can be accomplished in a distributed manner along the length of the seal. Local variations in the noise level along the length of the seal can thus be actively cancelled.

The responsive sound cancellation seal assemblies described above cancel the incident sound by sensing the amplitude and phase of the noise vibrations. The inputs are then utilized by the controller to actuate the active material so that an equal and opposite amplitude and phase can be made to occur in and about the seal area.

In another embodiment, the active seal assembly for responsive sound isolation may further include a passive absorption circuit (not shown). In this case, the active material may be connected to an electrical circuit such that power converted by the active material from mechanical to electrical energy is then dissipated electrically. This may be performed using an electrical resistor or the like. Further modifications may be made to the passive active materials system by placing filters in the electrical circuit so that certain frequencies may be damped and others undamped. In this case, the active material may be placed in the exterior or interior surfaces of the seal structure and connected to an embedded or external dissipation circuit. As such, the controller 28 would house only dissipative elements and possibly filtering components. The active material circuits could be distributed so as to provide locally tailored sound dissipation performance. Note that this arrangement is passive and does not require the application of external power. Suitable active materials include piezoelectric ceramics, piezoelectric polymers, and the like.

In another embodiment, an active material may again be used for passive damping. In this embodiment, the active material is not connected to an external circuit, but rather dissipates vibrational energy due to internal hysteresis. Many active materials exhibit hysteretic mechanical behavior due to the internal phase transformations and crystallographic rearrangements. Due to the hysteresis, cyclic motion as observed in sound pressure waves may be passively dissipated without the use of external circuits and wiring. Suitable materials for this concept include piezoelectric materials (ceramic and polymeric), magnetostrictive materials including monolithic and composite forms, shape memory alloy materials, and ionic actuators. It should be noted that this approach differs from typical viscolelastic material damping in that the damping can be much less temperature depending, and the larger stiffness of the materials allows more energy absorption per unit volume than is possible with typical elastomeric viscoelastic materials.

In another embodiment, the active seal assembly is configured for dissipative sound cancellation. Dissipative sound cancellation seal assemblies generally measure the average amplitudes and frequencies of the incident sound. Using these inputs, the active material based actuators in the seal compensate to absorb the frequencies. Because phase information is not used in this embodiment, mechanical resonators can be employed, if desired. Various non-limiting approaches include the use of MR fluids and elastomers, ER fluids and elastomers, magnetostrictive materials, and the like through control of domain wall motion, for example.

Figure 3:
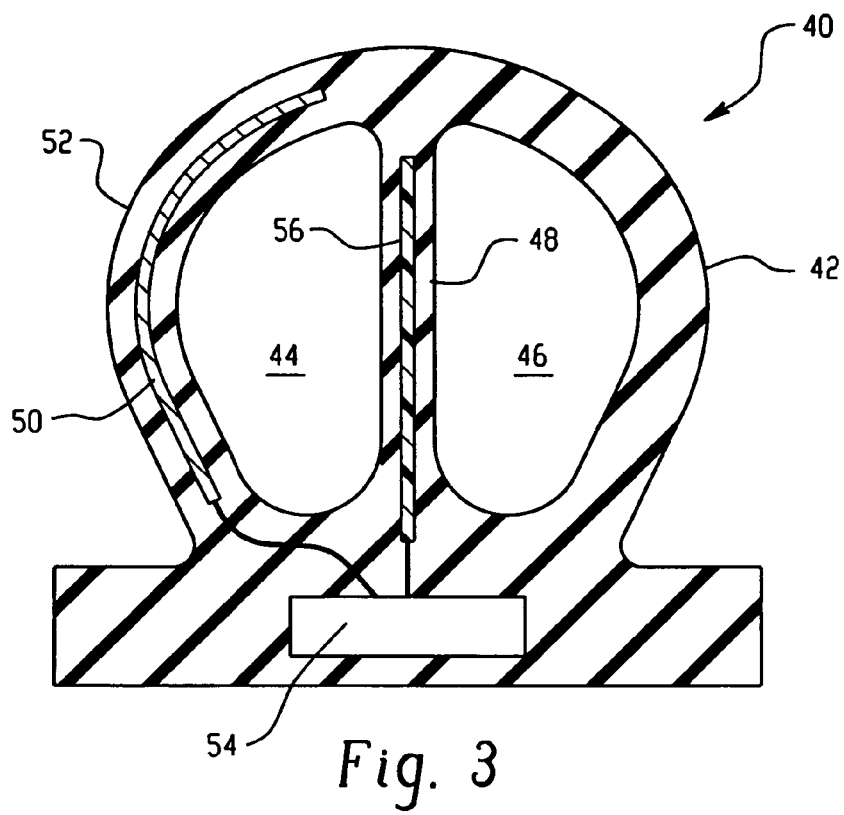
FIG. 3 is a cross sectional view of a active seal assembly adapted to provide dissipative sound cancellation.
Figure 4:
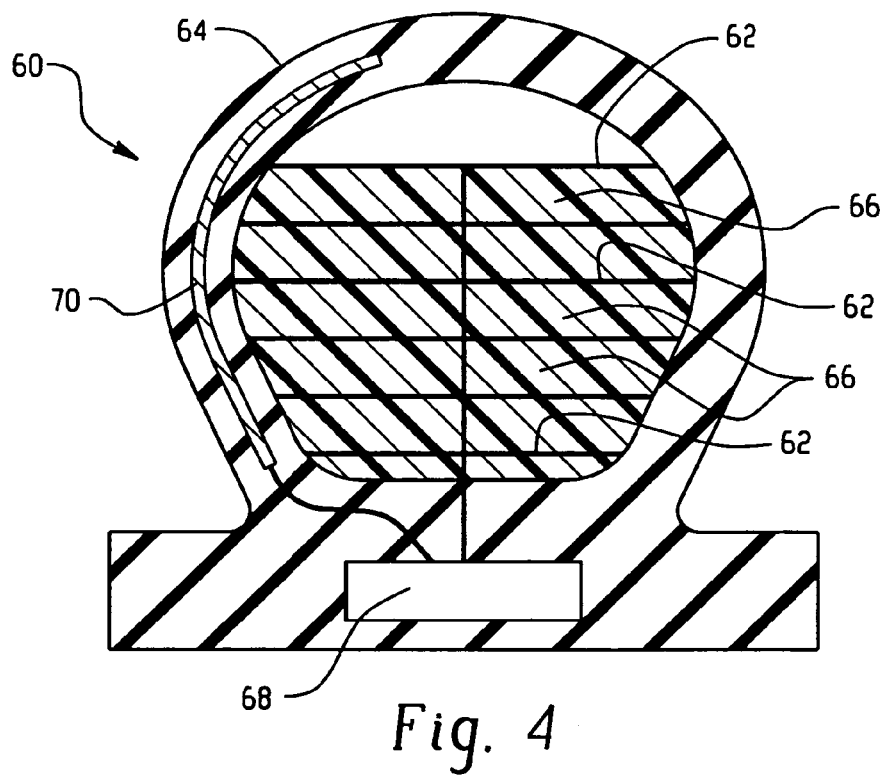
FIG. 4 is a cross sectional view of a active seal assembly adapted to provide dissipative sound cancellation in accordance with another embodiment.

FIGS. 3 and 4 illustrate exemplary active seal assemblies 40, 60, respectively, suitable for dissipative sound cancellation. In FIG. 3, illustrated seal assembly is configured to absorb primarily planar waves. The seal assembly 40 includes a hollow body 42 formed of a flexible material. The hollow body 42 includes two chambers 44, 46 defined by wall 48. A normal force sensor 50 is embedded in an external wall 52 in close proximity to the source of undesirable noise. Selection of a suitable commercially available normal force sensor is well within the skill of those in the art. The normal force sensor 50 is in operative communication with a controller 54. An active material 56 such as an MR fluid, ER fluid, and the like is disposed within the central wall 45. The active material is also in operative communication with the controller 54. In operation, the controller 54 receives sensory inputs from the normal force sensor 50, which then averages the amplitudes and frequencies of the incident sound. The controller is programmed to provide a suitable activation signal to the active material to change the modulus properties of the hollow body, which functions to absorb and/or dampen the noise signals received by the normal force sensor.

In FIG. 4, the active seal assembly 60 includes alternating elastic membranes 62. An active material 66 is disposed between the membranes 62, which are in operative communication with a controller 68. By engaging the active material, sound propagation through the seal body may be actively tuned. The seal assembly further includes a shear force sensor 70 in operative communication with the controller 68. The shear sensors have a central shear element that measures the tangential shear force in 360 degrees. Selection of a suitable commercially available shear force sensor is well within the skill of those in the art. The shear force sensor 70 is embedded within an external wall. Suitable active materials include electrorheological fluids and magnetorheological fluids. Alternatively, the membranes 62 themselves can be formed of the active material. Suitable active materials for forming the membranes include magnetorheological elastomers, thin film shape memory alloys, piezoelectric polymers, electroactive polymers, and the like. The illustrated seal assembly is configured so as to cancel primarily shear waves. For metal structures that support or contact the seal, conductive cancellation can be employed by coupling vibrational modes in the frame structure to the seal. Reduction in noise vibration amplitude is controlled by the degree to which the vibration modes are coupled from the structurally stiff material into the parallel vibration damping material.

A computer program, generally based on finite element analysis, can be used to design the shape and properties of the active material to be employed as the actuator, e.g., a piezoelectric material, so that it has the desired resonance frequencies that conform to the expected frequency and amplitude of the unwanted noise from outside the vehicle, e.g., noise outside the interior compartment such as engine noise, road noise, and the like. During operation, the active material matches the impedance of the sounds that are desired to be reduced. As is generally known by those in the art, impedance is proportional to pressure of the sound waves and inversely proportional to the velocity of sound.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric materials can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Conducting polymerization of different monomer segments with a blowing agent can be used to form the shape memory polymer foam. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N'dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen gas, and the like. The material can then be reverted to the permanent shape by heating the material above its Tg but below the highest then7nal transition temperature or melting point. Thus, by combining multiple soft segments it is possible to demonstrate multiple temporary shapes and with multiple hard segments it may be possible to demonstrate multiple permanent shapes.

As previously discussed, other suitable shape memory materials for fabricating the foams also include shape memory alloy compositions. Shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy foam is preferably at or below the austenite transition temperature (at or below As). Subsequent heating above the austenite transition temperature causes the expanded shape memory to revert back to its permanent shape. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable thin film shape memory alloy materials for fabricating the actuators include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. A preferred shape memory alloy is a nickel-titanium based alloy commercially available under the trademark FLEXINOL from Dynalloy, Inc. Selection of a suitable shape memory alloy composition depends on the temperature range where the component will operate.

Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Suitable MR fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Diameter sizes for the particles can be less than or equal to about 1000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers, and in particular dielectric elastomers include those polymeric materials that exhibit piezoelectric, pyroelectric, or electrostrictive properties in response to electrical or mechanical fields. When sandwiched between electrodes, the elastomer expands in the plane of the electrodes, amplifying the normal compression due to the electrostatic charges on the electrodes. The results are a large strain capability and a large actuation pressure.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 NPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers of the present disclosure may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present invention may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Magnetostrictive materials are generally materials that exhibit a strain when exposed to a magnetic field. In other words, magnetostrictive materials undergo a deformation when a magnetic field is present. The internal strain causes a change in length, which can be controlled by the magnetic field. Most ferromagnetic materials such as iron, nickel, cobalt, gadolinium, alloys thereof, and the like exhibit some measurable magnetostriction. Exemplary magnetostrictive materials are alloys of iron, dysprosium, and terbium.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. An active seal assembly for sound isolation, comprising:
   a flexible hollow body comprising an interior wall longitudinally bifurcating said body and defining in part a first chamber and a second chamber within said body;
   a sensor disposed in an exterior wall of the body and in operative communication with a controller, wherein the sensor detects an amplitude and a phase of a noise vibration and sends a signal corresponding to the amplitude and the phase to the controller; and
   an active material disposed within the interior wall and in operative communication with the controller, wherein the active material and interior wall cooperatively cancel the noise vibration in response to an activation signal from the controller.

2. The active seal assembly of claim 1, wherein the active material comprises one of an electroactive polymer, an ionic polymer metal composite, a piezoelectric polymer or ceramic, a magnetostrictive material, a film shape memory alloy.

3. The active seal assembly of claim 1, wherein the sensor and the active material are distributed along the length of the flexible hollow body.

4. The active seal assembly of claim 1, wherein the sensor comprises a piezoelectric polymer or ceramic.

5. The active seal assembly of claim 1, wherein the controller is disposed in a base portion of the body.

6. The active seal assembly of claim 1, further comprising a dissipative circuit in operative communication with the active material.

7. The active seal assembly of claim 1, wherein the active material is selected to provide passive damping of the vibration.

8. An active seal assembly for sound isolation, comprising:
   a flexible hollow body comprising a base portion and an interior wall, said interior wall longitudinally bifurcating said body and defining in part a first chamber and a second chamber within said body;
   a normal force sensor disposed in an exterior wall of the body and in operative communication with a controller, wherein the normal force sensor detects sound waves and sends a signal corresponding to the amplitudes and frequencies associated with the sound waves to the controller, wherein the controller averages the amplitudes and frequencies associated with the waves; and an active material disposed within the interior wall and in operative communication with the controller, wherein the active material is absorbs the waves in response to an activation signal from the controller.

9. The active seal assembly of claim 8, wherein the active material is one of an electrorheological fluid and a magnetorheological fluid comprising at least one on the foregoing active materials.

* * * * *